United States Patent
Van Der Westhuizen

(10) Patent No.: US 11,150,977 B1
(45) Date of Patent: Oct. 19, 2021

(54) SYSTEMS AND METHODS FOR REMEDIATING COMPUTING RESOURCES

(71) Applicant: Facebook, Inc., Menlo Park, CA (US)

(72) Inventor: Michael Christopher Van Der Westhuizen, Horsham (GB)

(73) Assignee: Facebook, Inc., Menlo Park, CA (US)

( * ) Notice: Subject to any disclaimer, the term of this patent is extended or adjusted under 35 U.S.C. 154(b) by 121 days.

(21) Appl. No.: 16/191,422

(22) Filed: Nov. 14, 2018

(51) Int. Cl.
*G06F 11/00* (2006.01)
*G06F 11/07* (2006.01)
*G06F 13/42* (2006.01)

(52) U.S. Cl.
CPC ...... *G06F 11/0793* (2013.01); *G06F 11/0745* (2013.01); *G06F 13/4282* (2013.01); *G06F 2213/0042* (2013.01)

(58) Field of Classification Search
CPC ............ G06F 11/1616; G06F 11/2205; G06F 11/2221; G06F 11/00–0796; G06F 11/08–1425; G06F 11/1428–3696
USPC .................................................. 714/5.1, 1–57
See application file for complete search history.

(56) References Cited

U.S. PATENT DOCUMENTS

| | | | | |
|---|---|---|---|---|
| 8,510,592 B1* | 8/2013 | Chan | ............... | G06F 11/0751 714/5.1 |
| 2002/0010881 A1* | 1/2002 | White | .............. | G06F 11/2094 714/44 |
| 2002/0073356 A1* | 6/2002 | Katayama | ............... | H04L 41/06 714/4.4 |
| 2003/0115382 A1* | 6/2003 | Kimoto | ............... | G06F 11/2221 710/1 |
| 2004/0210897 A1* | 10/2004 | Brockway | ............... | H04L 67/16 717/174 |
| 2006/0123201 A1* | 6/2006 | Wu | ............... | G06F 9/4406 711/147 |
| 2006/0161821 A1* | 7/2006 | Oshins | ............... | G06F 11/1438 714/52 |
| 2007/0255869 A1* | 11/2007 | Walters | ............... | G06F 11/2221 710/62 |
| 2007/0297600 A1* | 12/2007 | Narayanan | ............ | G06F 13/387 379/413.03 |
| 2008/0126650 A1* | 5/2008 | Swanson | ............. | G06F 11/0721 710/267 |
| 2008/0244313 A1* | 10/2008 | Upton | ................. | G06F 11/0745 714/26 |
| 2009/0217093 A1* | 8/2009 | Co | ................... | G01R 31/31723 714/30 |

(Continued)

*Primary Examiner* — Sarai E Butler
(74) *Attorney, Agent, or Firm* — FisherBroyles, LLP

(57) ABSTRACT

A computer-implemented method for remediating computing resources may include (i) detecting a failure in a computer peripheral device and (ii) performing a remediation action in response to detecting the failure in the computer peripheral device. The remediation action may include selectively modifying a signal to a computing bus to which the computer peripheral device is connected. Selectively modifying the signal to the computing bus may simulate both unplugging the computer peripheral device from the computing bus without physically removing the computer peripheral device and also plugging back the computer peripheral device into the computing bus without physically reinserting the computer peripheral device into the computing bus. Various other methods, systems, and computer-readable media are also disclosed.

20 Claims, 11 Drawing Sheets

(56) References Cited

U.S. PATENT DOCUMENTS

| | | | |
|---|---|---|---|
| 2009/0265722 A1* | 10/2009 | Lu | G06F 21/57 |
| | | | 719/327 |
| 2010/0293411 A1* | 11/2010 | Yokoyama | G06F 11/2289 |
| | | | 714/10 |
| 2011/0087830 A1* | 4/2011 | Toyoshima | H04M 1/0254 |
| | | | 711/103 |
| 2011/0160875 A1* | 6/2011 | Taguchi | G06F 9/485 |
| | | | 700/17 |
| 2013/0132614 A1* | 5/2013 | Bajpai | G06F 13/4286 |
| | | | 710/10 |
| 2014/0068317 A1* | 3/2014 | Kanigicherla | G06F 9/5011 |
| | | | 714/2 |
| 2014/0240138 A1* | 8/2014 | Lee | H04W 52/0277 |
| | | | 340/636.1 |
| 2015/0058660 A1* | 2/2015 | Baker | G06F 11/0745 |
| | | | 714/5.1 |
| 2017/0019365 A1* | 1/2017 | Giansiracusa | H04L 51/18 |
| 2017/0075777 A1* | 3/2017 | Dunn | G06F 11/2028 |
| 2018/0115476 A1* | 4/2018 | Borlick | G06F 11/2056 |
| 2018/0129492 A1* | 5/2018 | Singh | G06F 11/00 |
| 2019/0370139 A1* | 12/2019 | Vichare | H04L 41/082 |

\* cited by examiner

SYSTEMS AND METHODS FOR REMEDIATING COMPUTING RESOURCES

BACKGROUND

In the modern marketplace for consumer electronics and computing goods, manufacturers offer products at two levels of performance. At a first tier of performance, manufacturers may offer direct-to-consumer goods that provide a consumer-level of performance and reliability. Because manufacturers market these goods directly to consumers themselves, the manufacturers may set the price for these goods at a relatively lower and more affordable price point. Moreover, the lower level of performance and reliability may require consumers to occasionally perform manual remediation operations, such as unplugging and re-plugging a computing peripheral device, to restart the device after it has failed.

In contrast, at a second tier of performance, manufacturers may also offer a professional-level of performance and reliability. To establish the higher level of performance and reliability, manufacturers may set the corresponding price point at a relatively higher level. Accordingly, at the second tier of performance, manufacturers may market these professional-level computing goods to larger firms, institutions, and enterprise organizations. These larger firms, institutions, and enterprise organizations may have larger budgets that can afford the higher price point of these better performing computing goods.

Nevertheless, the lower price point of the consumer-level computing goods may still be attractive to the larger firms, institutions, and enterprise organizations to which manufacturers market the higher priced professional-level computing goods. Accordingly, it would be desirable to obtain the higher level of performance and reliability associated with the professional-level computing goods while also enjoying the relatively lower price point associated with the consumer-level goods. The instant disclosure, therefore, identifies and addresses a need for better remediating computing resources.

SUMMARY

As will be described in greater detail below, the instant disclosure describes various systems and methods for remediating computer resources. In one example, a computer-implemented method for remediating computing resources may include (i) detecting a failure in a computer peripheral device and (ii) performing a remediation action in response to detecting the failure in the computer peripheral device. The remediation action may include selectively modifying a signal to a computing bus to which the computer peripheral device is connected to simulate both (i) unplugging the computer peripheral device from the computing bus without physically removing the computer peripheral device and (ii) plugging back the computer peripheral device into the computing bus without physically reinserting the computer peripheral device into the computing bus.

In some examples, the computing bus may include a UNIVERSAL SERIAL BUS. In additional examples, the remedial action may be performed by a computing device to autonomously simulate a user re-plugging the computer peripheral device without manual intervention. In some embodiments, detecting the failure in the computer peripheral device is performed autonomously by a computing device without manual intervention.

In some examples, detecting the failure in the computer peripheral device may include (i) accessing a device profile that specifies criteria for distinguishing between a failure situation and a non-failure situation, (ii) applying the device profile to output produced by the computer peripheral device, and (iii) determining, in response to applying the device profile to the output produced by the computer peripheral device, that the computer peripheral device has failed.

In further embodiments, detecting the failure in the computer peripheral device is performed by receiving an indication from a user that the computer peripheral device has failed. In further examples, the failure may include one of: (i) a total failure of the computer peripheral device and (ii) a partial failure of the computer peripheral device.

In additional examples, selectively modifying the signal to the computing bus to which the computer peripheral device is connected includes discontinuing the signal. In further embodiments, selectively modifying the signal to the computing bus to which the computer peripheral device is connected includes discontinuing all signals between the computing bus and the computer peripheral device. In further examples, the remediation action is performed in response to detecting the failure in the computer peripheral device such that the computer peripheral device achieves an enterprise-grade level of reliability, according to a predefined reliability metric, rather than a consumer-grade level of reliability.

In one example, a corresponding system for remediating computing resources may include (i) a detection module, stored in memory, that detects a failure in a computer peripheral device and (ii) a performance module, stored in memory, that performs a remediation action in response to detecting the failure in the computer peripheral device. In these examples, the remediation action may include selectively modifying a signal to a computing bus to which the computer peripheral device is connected to simulate both (i) unplugging the computer peripheral device from the computing bus without physically removing the computer peripheral device and (ii) plugging back the computer peripheral device into the computing bus without physically reinserting the computer peripheral device into the computing bus. In this example, the system may also include a physical processor that is configured to execute the detection module and the performance module.

In further examples, a corresponding computer-readable medium may include computer-readable instructions that, when executed by at least one processor of a computing device, cause the computing device to: (i) detect a failure in a computer peripheral device and (ii) perform a remediation action in response to detecting the failure in the computer peripheral device. In these examples, the remediation action may include selectively modifying a signal to a computing bus to which the computer peripheral device is connected to simulate both (i) unplugging the computer peripheral device from the computing bus without physically removing the computer peripheral device and (ii) plugging back the computer peripheral device into the computing bus without physically reinserting the computer peripheral device into the computing bus.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
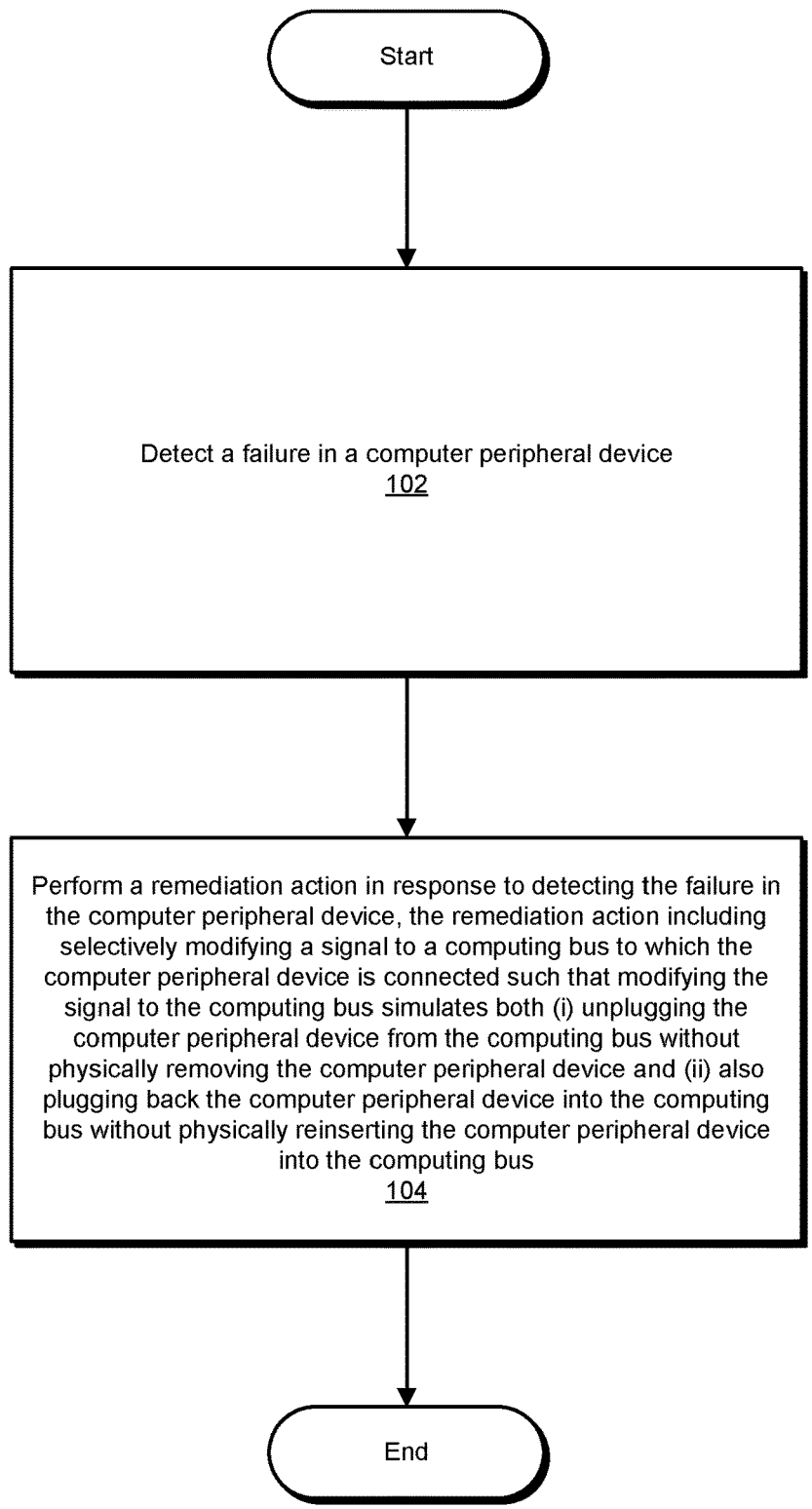
FIG. 1 is a flow diagram of an example method for remediating computing resources.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for remediating computing resources. As will be explained in greater detail below, the disclosed systems and methods may improve upon related systems by leveraging lower cost consumer-grade computing goods to nevertheless provide a professional-grade level of performance and reliability. The disclosed systems and methods may provide these benefits by simulating the unplugging and re-plugging of a computer peripheral device at a larger computing device without actually removing and reinserting the computer peripheral device. Instead, the disclosed systems and methods may selectively modify one or more signals along the computing bus to which the computer peripheral device is connected to thereby simulate the unplugging and re-plugging action that would otherwise be performed manually by a user.

The following will provide, with reference to FIG. 1, detailed descriptions of computer-implemented methods for distributed management of computing resources. Detailed descriptions of corresponding example systems will also be provided in connection with FIGS. 2-11.

FIG. 1 is a flow diagram of an example computer-implemented method 100 for distributed management of computing resources. The steps shown in FIG. 1 may be performed by any suitable computer-executable code and/or computing system, such as the systems described herein. In one example, each of the steps shown in FIG. 1 may represent an algorithm whose structure includes and/or is represented by multiple sub-steps, examples of which will be provided in greater detail below.

Figure 2:
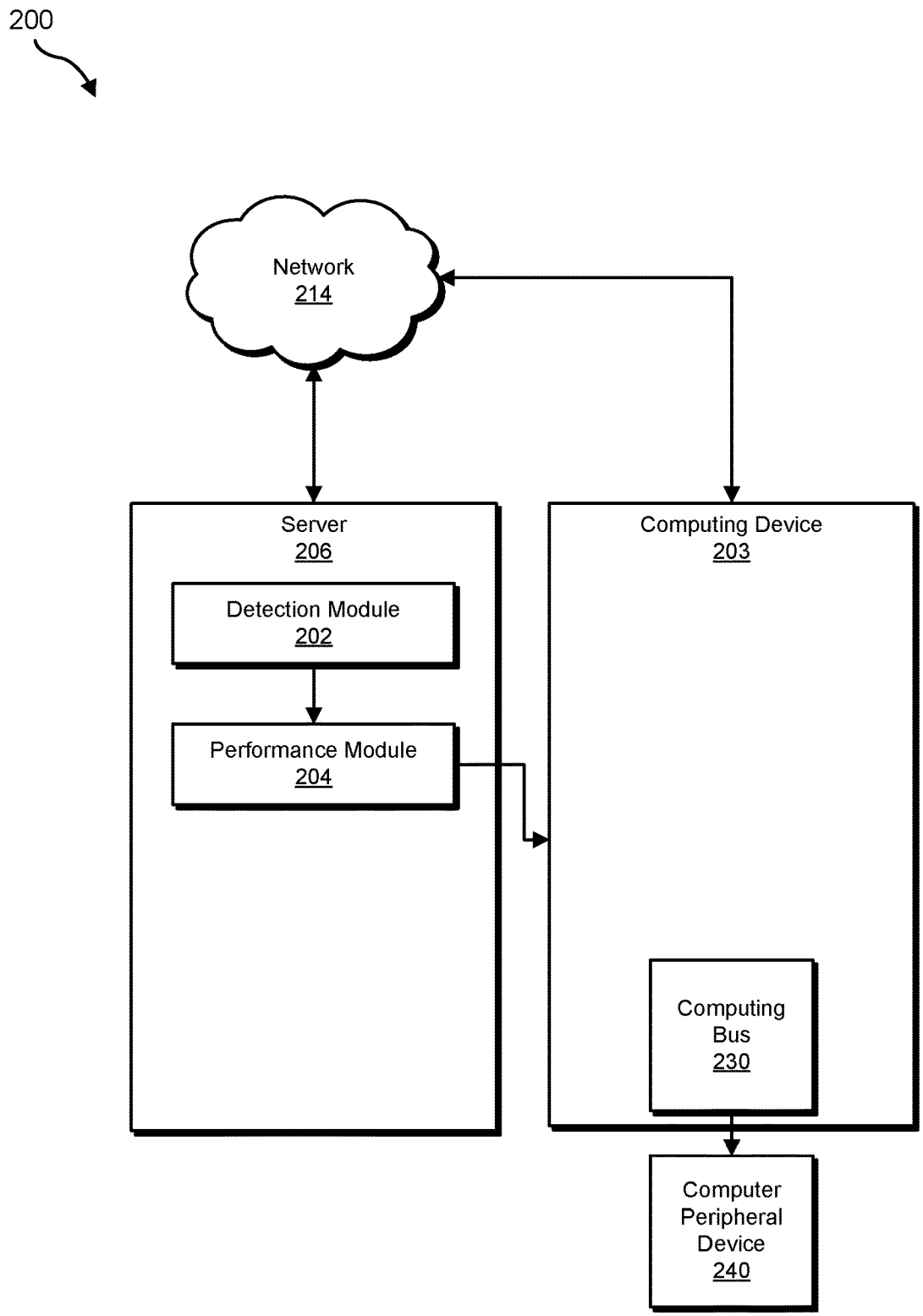
FIG. 2 is a block diagram of an example system for remediating computing resources.

As illustrated in FIG. 1, at step 102, one or more of the systems described herein may detect a failure in a computer peripheral device. As used herein, the term "computer peripheral device" generally refers to any modular component that may be inserted into a larger computing device to supplement the functionality of the computing device. In some examples, the computer peripheral device may be inserted into an expansion socket that is located on the external casing of a laptop or desktop for convenient access by a consumer user. In other examples, the computer peripheral device may be inserted into an expansion socket that is located within the external casing of the larger computing device, such as a laptop or desktop, and thereby requires a user or administrator to open up the external casing in order to insert the computer peripheral device. For example, FIG. 2 is a block diagram of example system 200 for remediating computing resources. As illustrated in FIG. 2, a server 206 may include a detection module 202 that detects a failure of a computer peripheral device 240 that is connected to a computing bus 230 of computing device 203.

In the example of FIG. 2, both detection module 202 and performance module 204 are located at, or disposed in, a computing device such as server 206 and/or computing device 203. Additionally or alternatively, one or both of detection module 202 and performance module 204 may optionally be located at, or disposed in, computer peripheral device 240.

In one illustrative example, the connection at computing bus 230 shown in FIG. 2 corresponds to a UNIVERSAL SERIAL BUS or USB expansion socket. Additionally or alternatively, computing bus 230 may correspond to any other suitable or illustrative example of computing buses and/or expansion sockets connected to such computing buses, including those formatted according to one or more of the following protocols: motherboard expansion bus slots such as ISA (INDUSTRY STANDARD ARCHITECTURE), PCI (PERSONAL COMPONENT INTERCONNECT), EISA (extended ISA) (which may further include either SIMM or SINGLE IN-LINE MEMORY MODULE or DIMM or DUAL IN-LINE MEMORY MODULE), MCA (MICRO-CHANNEL ARCHITECTURE), AGP (ACCELERATED GRAPHICS PORT), VESA (VIDEO ELECTRONIC STANDARDS ASSOCIATION), PCMCIA (PERSONAL COMPUTER MEMORY CARD INTERNATIONAL ASSOCIATION), PCI-E (PCI EXPRESS), and HT (HYPERTRANSPORT), disk interfaces such as ATA (AT ATTACHMENT), IDE (INTEGRATED DRIVE ELECTRONICS), ENHANCED IDE, floppy disk, SCSI (SMALL COMPUTER SYSTEMS INTERFACE), ESDI (ENHANCED SMALL DEVICE INTERFACE), PCMCIA, SATA (SERIAL ATA), and/or ETHERNET, and/or external bus protocols such as PAR- ALLEL (or "LINE PRINTER"), SERIAL (such as RS232C or RS422), PS/2, IrDA (INFRARED DEVICE ATTACHMENT), and/or FireWire.

Computing device 203 generally represents any type or form of computing device capable of reading computer-executable instructions. For example, computing device 203 may correspond to a client-side workstation that is provided to an employee by a corporate enterprise organization for work purposes. Additionally or alternatively, computing device 203 may correspond to a modular computing device within a larger computing warehouse. Additional examples of computing device 203 may include, without limitation, laptops, tablets, desktops, application servers, database servers, and/or mainframes configured to run certain software applications and/or provide various security, web, storage, and/or management services. Although illustrated as a single entity in FIG. 2, computing device 203 may include and/or represent a plurality of computing devices that work and/or operate in conjunction with one another.

Server 206 generally represents any type or form of computing hardware or software capable of reading computer-executable instructions. For example, server 206 may correspond to an administrative server that monitors for, and potentially remediates, failures at client workstations such as computing device 203. Server 206 may also represent part of a cloud-based environment that provides resources to clients. As used herein, the terms "cloud-based environment" or "cloud service" generally refer to a resource or service that is provided over a network, such as the Internet. Additional examples of server 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, databases, operating systems, software environments, virtual machines, routers and/or network devices, combinations of one or more of the same, and/or any other suitable computing resource.

Network 214 generally represents any medium or architecture capable of facilitating communication or data transfer. In one example, network 214 may facilitate communication between computing device 203 and server 206. Network 214 may also represent a cloud-based network that facilitates communication between multiple computing resources and computing devices to manage the resources. In these examples, network 214 may facilitate communication or data transfer using wireless and/or wired connections. Examples of network 214 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Detection module 202 may detect the failure in the computer peripheral device in a variety of ways. In general, detection module 202 may detect the failure in the computer peripheral device at least in part by receiving an indication that the computer peripheral device has experienced the failure. In further examples, detection module 202 may monitor communications with the computer peripheral device in order to detect when a failure at the computer peripheral device occurs. For example, detection module 202 may monitor output produced by the computer peripheral device. Detection module 202 may subsequently compare some, or all, of the monitored output against a stored failure policy that defines whether the output indicates a corresponding failure. Additionally or alternatively, detection module 202 may also monitor input, and not just output, that is communicated to the computer peripheral device to determine whether the input indicates a failure. For example, a repetition of an input command, beyond a threshold number of instances, may indicate that the original instance of the input command was not properly processed, which further indicates that the computer peripheral device has failed.

In some examples, detection module 202 may access a device profile that specifies criteria for distinguishing between a failure situation and a non-failure situation. For example, the criteria for distinguishing between a failure situation and a non-failure situation may define appropriate, suitable, and/or tolerable input and/or output data for the computer peripheral device. The criteria may specify a threshold of dynamism and/or stasis for the input and/or output. In the case of a videoconferencing camera, output that is consistently blank or unchanging may indicate a device failure. In contrast, output that is dynamically changing in accordance with a measurement of dynamism that is modeled on ordinary and actual instances of videoconferencing may indicate that the device has not failed. In these examples, detection module 202 may apply the device profile to output produced by the computer peripheral device. Subsequently, detection module 202 may determine, in response to applying the device profile to the output produced by the computer peripheral device, that the computer peripheral device has failed.

In some examples, the failure in the computer peripheral device may correspond to a partial failure of the computer peripheral device. As used herein, the term "partial failure" generally refers to a scenario where the computer peripheral device has ceased to properly perform along at least one dimension even while continuing to perform along another dimension. In other words, in the scenario of a partial failure, the computer peripheral device has ceased to perform a proper subset of its designer-specified functionality while nevertheless continuing to perform a remaining proper subset of the designer-specified functionality. Alternatively, the failure in the computer peripheral device may correspond to a total failure of the computer peripheral device, in which case the computer peripheral device may have ceased to perform all of its designer-specified functionality.

In some examples, detection module 202 may detect the failure in the computer peripheral device autonomously, as part of a computing device, without manual intervention. In these examples, detection module 202 may perform the detection step autonomously in a manner that eliminates the involvement of one or more users or administrators in detecting the failure in the computer peripheral device. Alternatively, in some examples, detection module 202 may detect a failure in the computer peripheral device based in part, or based entirely, on receiving an indication from a human user that the failure in the computer peripheral device has occurred.

Figure 9:
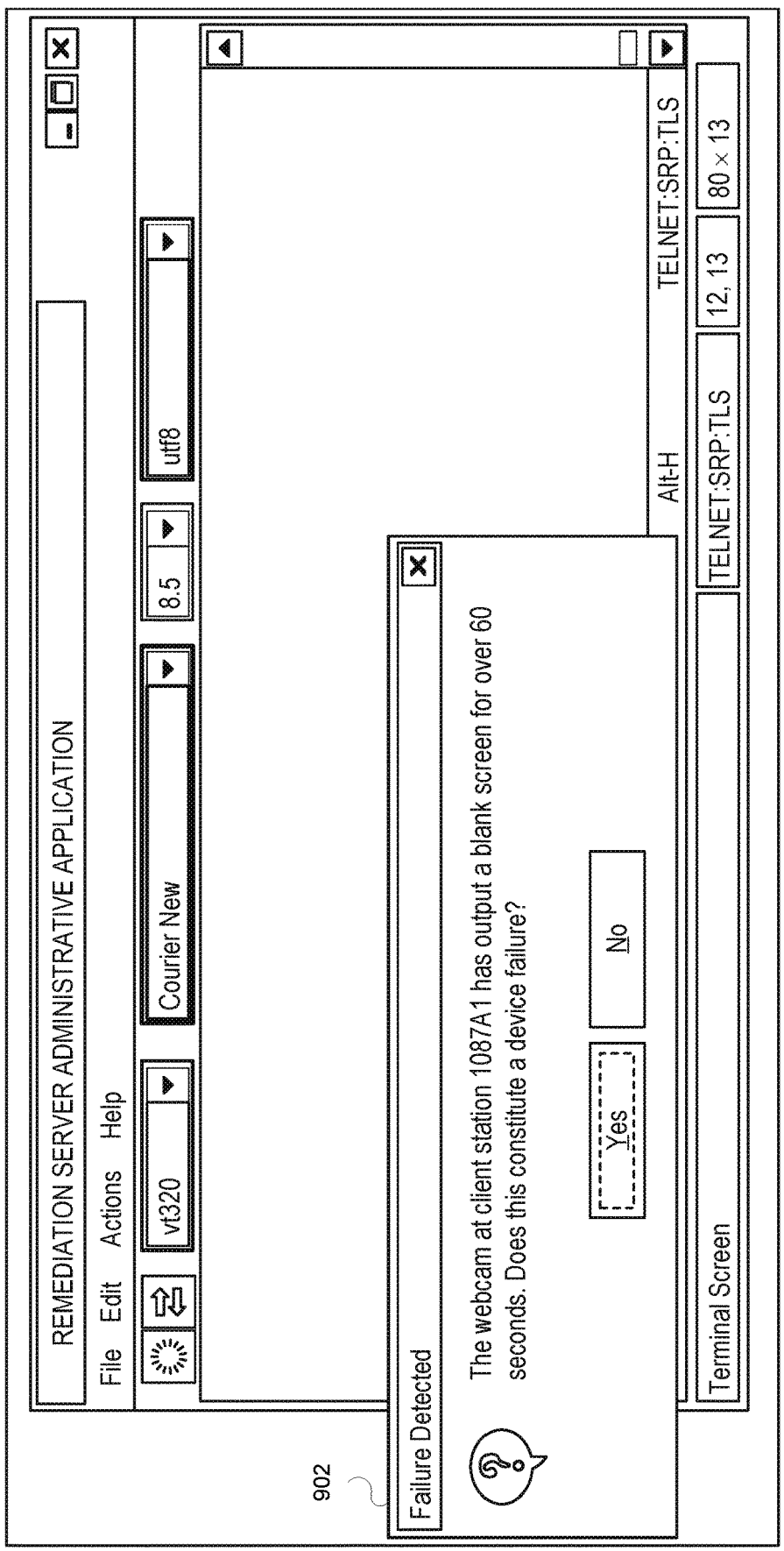
FIG. 9 is an illustration of an example graphical user interface that may be used in connection with the systems and methods for remediating computing resources.

FIG. 9 shows an example illustration of a graphical user interface for a "remediation server administrative application." This graphical user interface may correspond to an application that an administrator may use as part of the systems and methods for remediating computing resources discussed throughout this application. In some examples, the graphical user interface may be displayed by the remediation server administrative application executing at server 206, as discussed further above in connection with FIG. 2. In the example of FIG. 9, the graphical user interface may display, in a pop-up window 902, the prompt "the webcam at the client station 1087A1 has output a blank screen for over 60 seconds." The prompt may continue by asking the administrator "does this constitute a device failure?" The administrator may subsequently respond to this prompt by clicking a graphical user interface button for either "yes" or "no." More generally, in these examples detection module 202 may optionally receive an indication from the user that the computer peripheral device has failed.

In response, detection module 202 may use this manual input as a decisive factor to conclude that the computer peripheral device has experienced the failure. Alternatively, in other examples detection module 202 may use this manual input as merely one factor, among a number of different other factors, that detection module 202 may evaluate in deciding whether to conclude that the computer peripheral device has experienced a failure. Moreover, in response to determining that the computer peripheral device has experienced the failure, performance module 204 may subsequently perform remediation step 104, as discussed further below.

Returning to FIG. 1, at step 104 one or more of the systems described herein may perform a remediation action in response to detecting the failure in the computer peripheral device. In these examples, the remediation action may include selectively modifying at least one signal to a computing bus to which the computer peripheral device is connected. Moreover, in these examples, the remediation action may selectively modify the signal in a manner such that the modification of the signal simulates both (i) unplugging the computer peripheral device from the computing bus without physically removing the computer peripheral device and (ii) plugging back the computer peripheral device into the computing bus without physically reinserting the computer peripheral device into the computing bus. For example, at step 104, performance module 204 may perform the remedial action in response to detecting the failure in the computer peripheral device.

Performance module 204 may perform the remedial action in a variety of ways. In general, performance module 204 may perform the remedial action in any manner that suitably simulates the unplugging and re-plugging action that a user would otherwise manually perform with a computer peripheral device. Accordingly, the disclosed subject matter leverages the insight that consumer-grade computing components, such as USB-connected peripheral devices, are frequently remediated by users manually when the users simply unplug the peripheral device and then reinsert the peripheral device into the corresponding expansion socket. The disclosed subject matter improves upon this tedious and manual operation by intelligently automating it in a manner that eliminates human intervention, and corresponding human error, while also dramatically improving the speed of the remediation operation. Additionally the automation of the simulated unplugging and re-plugging action may be performed on a massive scale, such as the action being uniformly applied across a server farm or data warehouse, which would thereby eliminate the need for a human user to walk throughout the spacious data farm or data warehouse and engage in the tedious, error-prone, and/or repetitive manual unplugging and re-plugging action.

Moreover, the disclosed subject matter may not simply automate the unplugging and re-plugging action that was previously performed manually by human users, because the disclosed subject matter improves upon this previous manual technique by eliminating the need for the computer peripheral device to actually be physically unplugged and physically reinserted into the corresponding expansion socket. Instead, the disclosed subject matter improves upon the previous manual technique by simulating this remediation action in a manner that provides the same remedial benefits while eliminating the need to physically unplug and physically reinsert the computer peripheral device.

In some examples, performance module 204 may perform the remedial action at least in part by selectively modifying the signal to the computing bus such that the signal to the computing bus is discontinued. In these examples, performance module 204 may leverage the insight that computer peripheral devices connected to computing buses function by communicating across an electric connection. Accordingly, discontinuing a signal between the computing bus and the computer peripheral device may simulate the unplugging of the computer peripheral device, which would otherwise prevent electric current from traveling between the computing bus and the computer peripheral device. In some examples, performance module 204 may be implemented in the form of a software module that discontinues the signal to the computing bus through one or more software instructions. In further examples, performance module 204 may operate by optionally isolating (or grounding) one or more electrical lines of the computing bus and/or one or more electrical lines of the computer peripheral device.

Additionally or alternatively, performance module 204 may be implemented in the form of a hardware module, which may physically prevent electric current from being carried across the physical connection that is otherwise maintained by the computer peripheral device remaining plugged into the corresponding expansion socket during the simulated remediation action of step 104. For example, a transistor may be disposed along one or more lines of the computing bus and/or the computer peripheral device, and the transistor may be selectively switched to either enable, or prevent, current from passing between the computer peripheral device and the computing bus. Furthermore, in some examples, performance module 204 may discontinue the signal to the computing bus by discontinuing all signals between the computing bus and the computer peripheral device. In any of the above examples, performance module 204 may discontinue the signal for a specified period of time, such as one second or five seconds, although even a much smaller period of time, such as a fraction of a second, may be sufficient to successfully simulate the unplugging of the computer peripheral device and re-plugging of the computer peripheral device in a manner that still enjoys the remedial benefits of actually physically performing the unplugging and re-plugging action.

Importantly, as used herein the phrase "selectively modifying" generally refers to performance module 204 performing the remedial action of step 104 in a selective manner that selectively modifies one or more signals between the computing bus and the computer peripheral device while nevertheless permitting other signals on the computing bus, and/or elsewhere within the larger computing device, to continue according to routine and normal computing device operations. For example, performance module 204 may discontinue the signal across a power line of the computer peripheral device. Additionally or alternatively, performance module 204 may discontinue signals across all lines connecting between the computing bus and the computer peripheral device, while nevertheless permitting all other electric lines within the larger computing system to operate according to normal and routine operations. In other words, performance module 204 may target one or more electrical signals associated with the computer peripheral device based on the fact that the failure was detected at the computer peripheral device rather than other signals associated with other computing components where failure has not been detected. In this manner, the disclosed subject matter may improve upon a non-selective manual operation where a human user reboots the larger computing device by simply turning off the power switch and then turning the power switch back on. Accordingly, the disclosed subject matter may improve upon this previous manual technique by selectively modifying, or discontinuing, one or more signals while permitting a remaining set of signals to nevertheless continue according to routine or normal computing device operations. In other words, "selectively modifying" the signal to the computing bus may simulate the previous manual operation of a human user physically unplugging the computer peripheral device, and then re-plugging the computer peripheral device into the larger computing device, while nevertheless permitting the larger computing device to otherwise proceed according to normal and routine operations, in contrast to simulating the operation of the human user simply rebooting the larger computing device by toggling a power switch.

Figure 3:
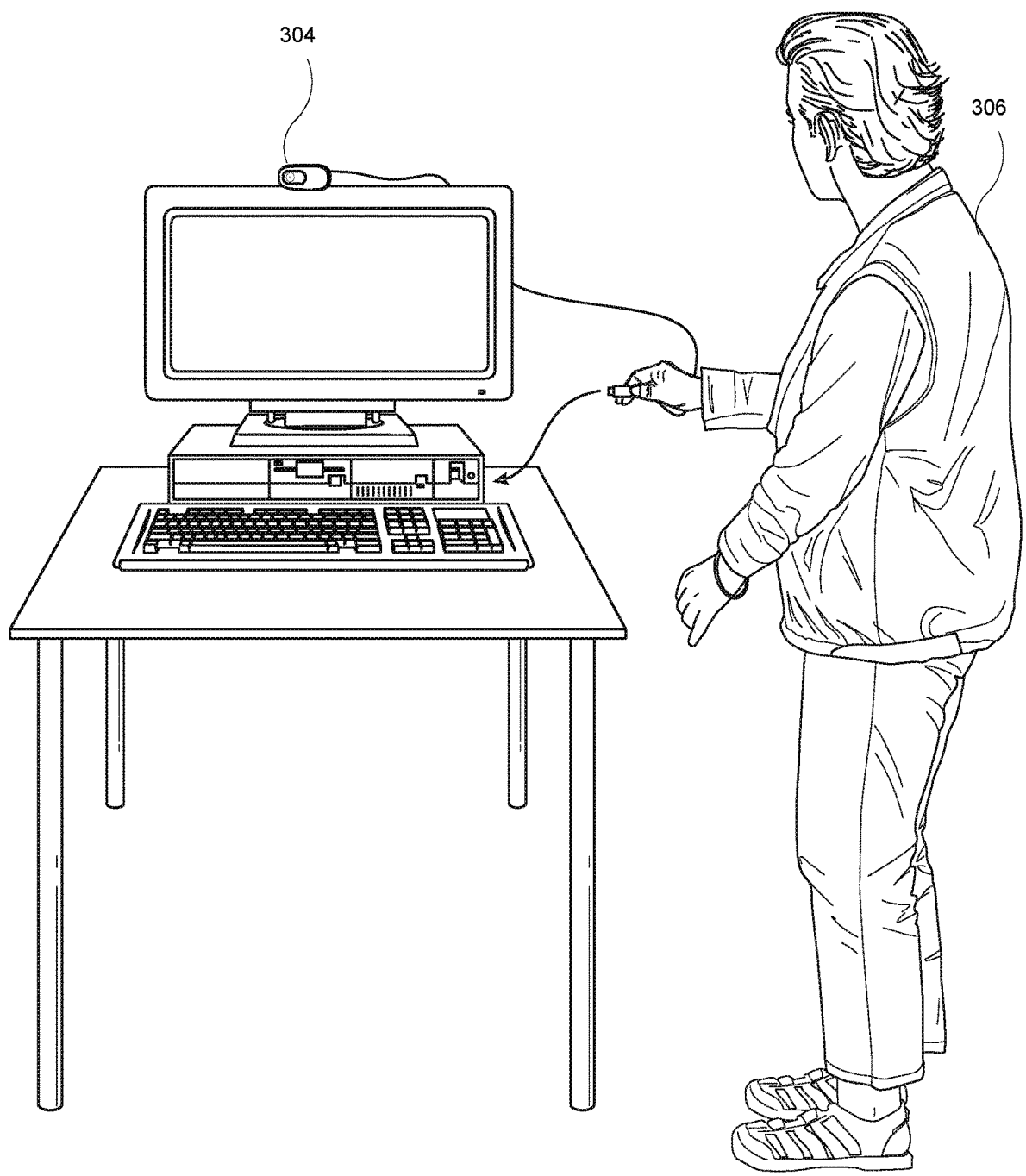
FIG. 3 is an illustration of a user beginning to plug in a computer peripheral device.
Figure 4:
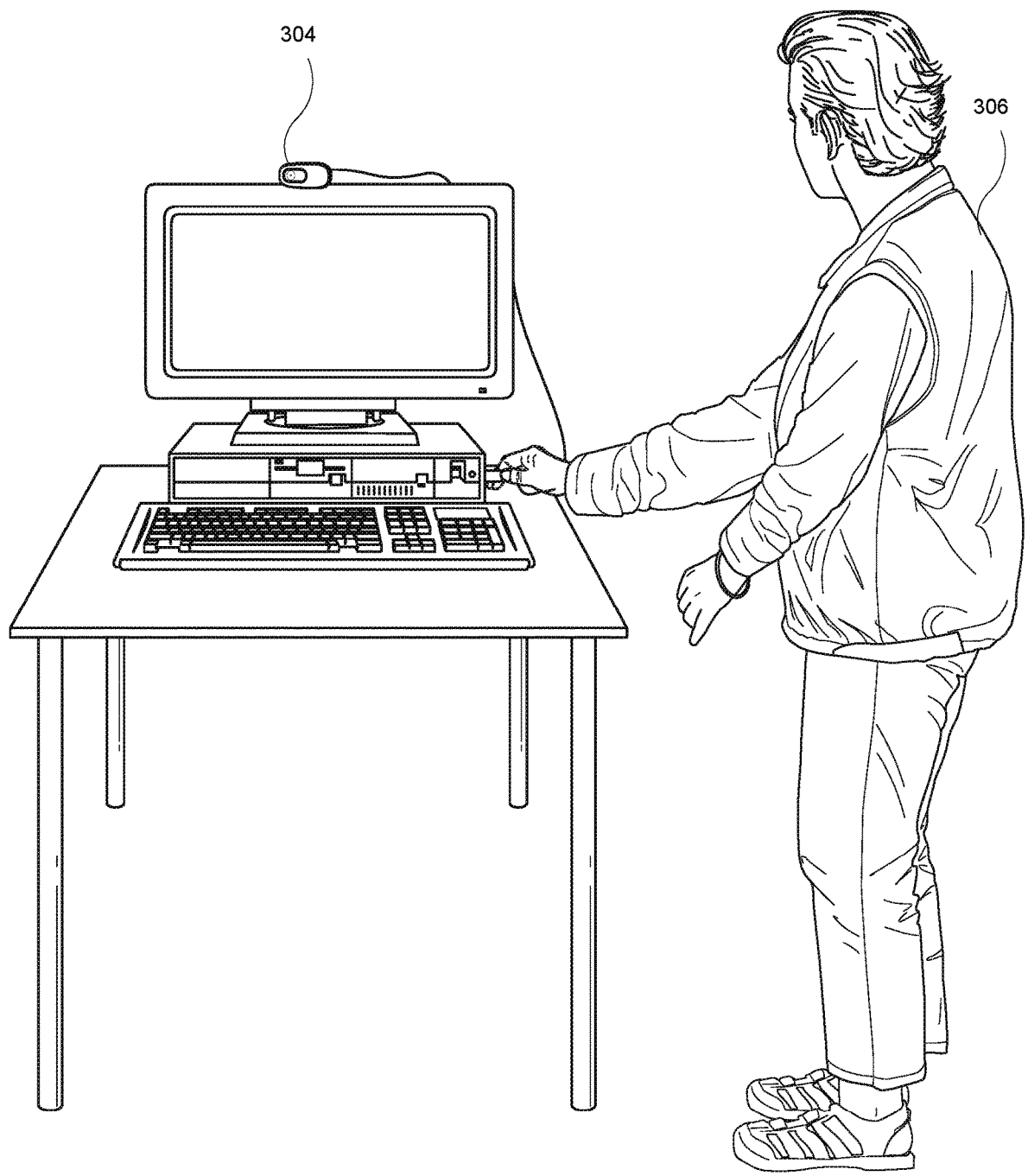
FIG. 4 is an illustration of the user completing the motion of plugging in the computer peripheral device.
Figure 5:
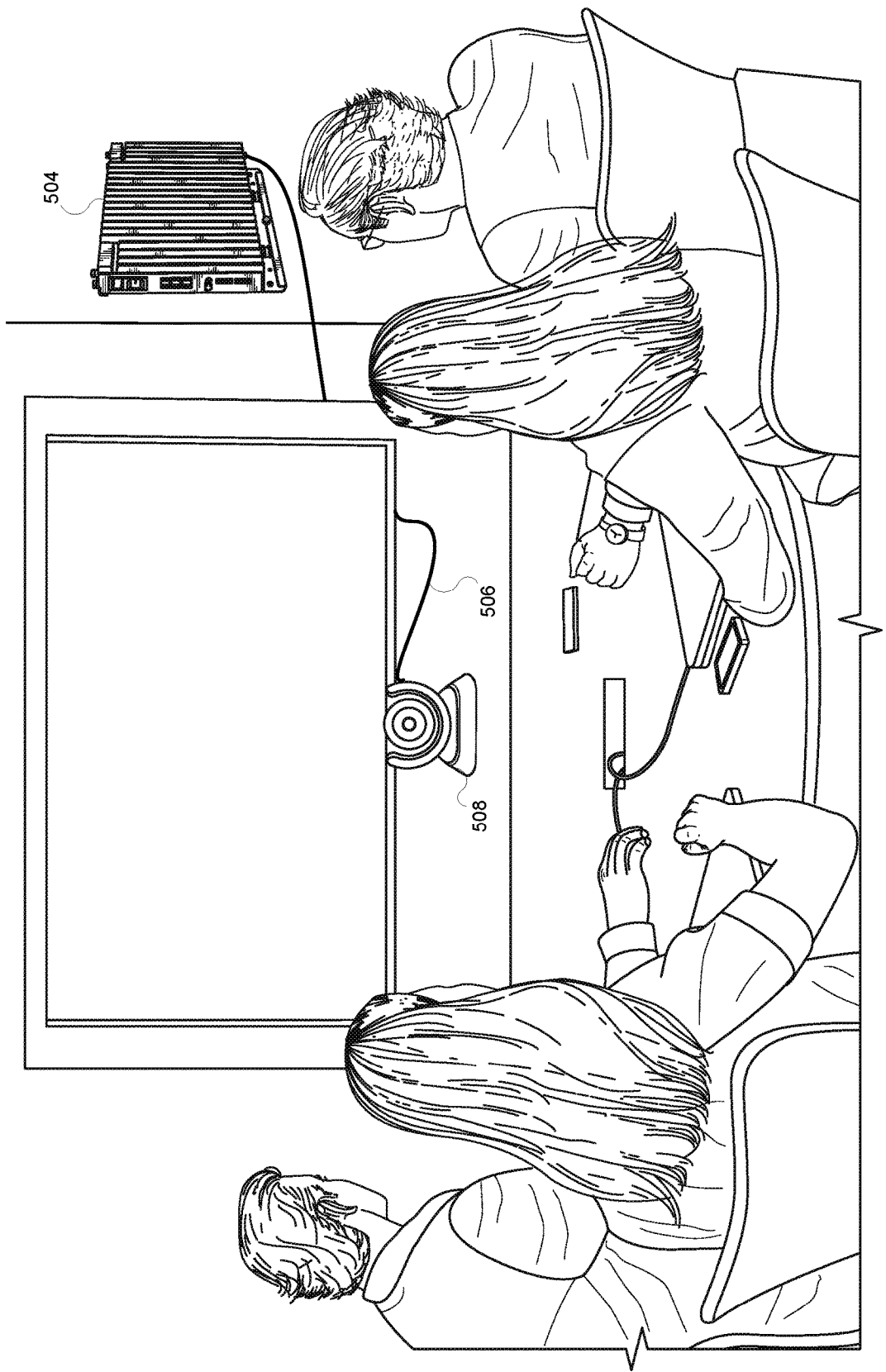
FIG. 5 is an illustration of a group of users using a videoconferencing system connected to a high-reliability computing system.

For purposes of illustration, FIG. 3 shows an example figure in which a human user 306 is beginning the process of manually plugging in a USB-connected webcam 304. The arrow shown in FIG. 3 further illustrates the motion that the human user may engage in to physically and manually plug in the USB-connected webcam. Similarly, FIG. 4 shows a corresponding example figure in which the same human user has completed the process of manually plugging in the USB-connected webcam. In contrast to the previous manual technique as illustrated in FIGS. 3 and 4, various embodiments disclosed in this application may enable a user to enjoy the benefits of the plugging and re-plugging procedure shown in FIGS. 3 and 4 but without actually performing that physical motion. For example, FIG. 5 shows a group of users using a videoconferencing system, including a videoconferencing system camera 508, which is connected by a computer peripheral device cable 506 to a computing system 504. Computing system 504 may correspond to computing device 203 shown in FIG. 3. In some examples, computing system 504 may be specially designed for high reliability in a commercial, professional, and/or enterprise environment as distinct from a consumer environment. For example, computing system 504 may optionally be configured to operate through a passive cooling system rather than an active cooling system. Moreover, FIG. 5 further illustrates how computing system 504 may optionally be vertically mounted on a wall for convenient access.

In contrast to the high reliability achieved by the manufacturing specifications for computing system 504, the videoconferencing system, including videoconferencing system camera 508, may only be manufactured according to specifications that provide a consumer grade level of reliability without the further operation of system 200. Nevertheless, the further operation of system 200, in accordance with method 100, may convert the videoconferencing system such that the video conferencing system achieves a commercial, professional, and/or enterprise grade of reliability that is more consistent with the high reliability achieved by computing system 504 according to manufacturer specifications.

Figure 6:
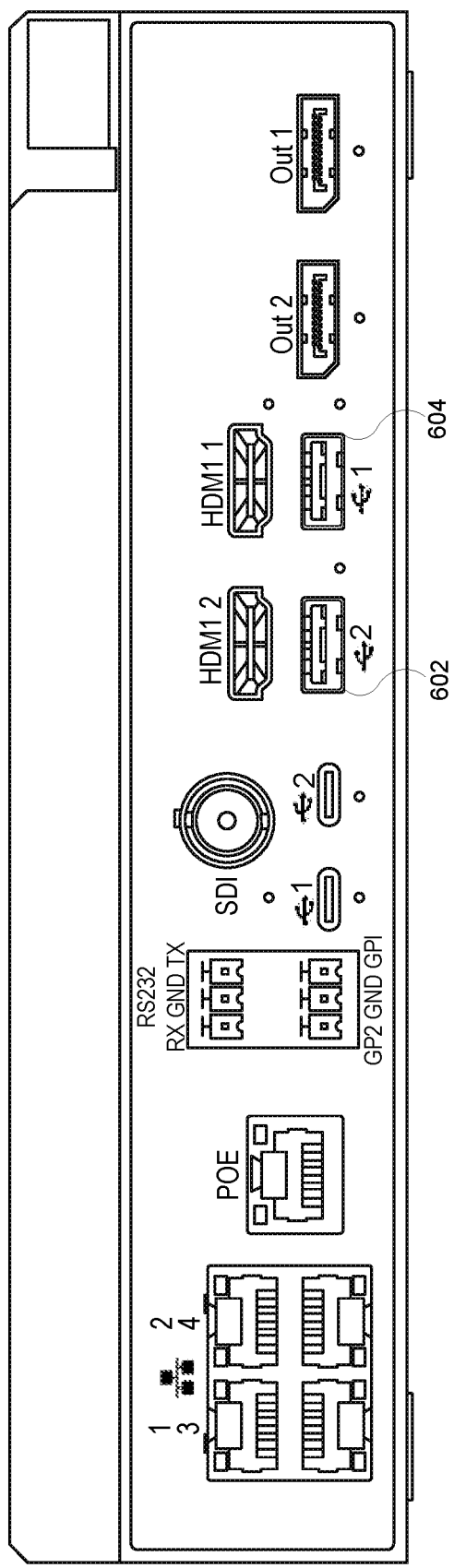
FIG. 6 is an illustration of ports available on one side of the high-reliability computing system.

For purposes of illustration, FIG. 6 shows an example side panel of computing system 504. As further shown in this illustration, the example side panel may include a USB 3.0 port 602 and a USB 3.0 port 604. Accordingly, videoconferencing system camera 508 of the videoconferencing system shown in FIG. 5 may optionally be connected to one or both of USB 3.0 port 602 and USB 3.0 port 604 via computer peripheral device cable 506. Moreover, in additional or alternative examples videoconferencing system camera 508 may be connected to computing system 504 through any other suitable alternative port, as further discussed above.

As further discussed above, in the example embodiments of this application the computer peripheral device may physically remain plugged into the corresponding expansion socket, while remaining still and inert, rather than being physically unplugged and re-plugged into the expansion socket. Accordingly, the disclosed subject matter improves upon the previous manual technique by eliminating entirely any need for a human user to perform the tedious, repetitive, and error-prone unplugging and re-plugging procedure.

Figure 10:
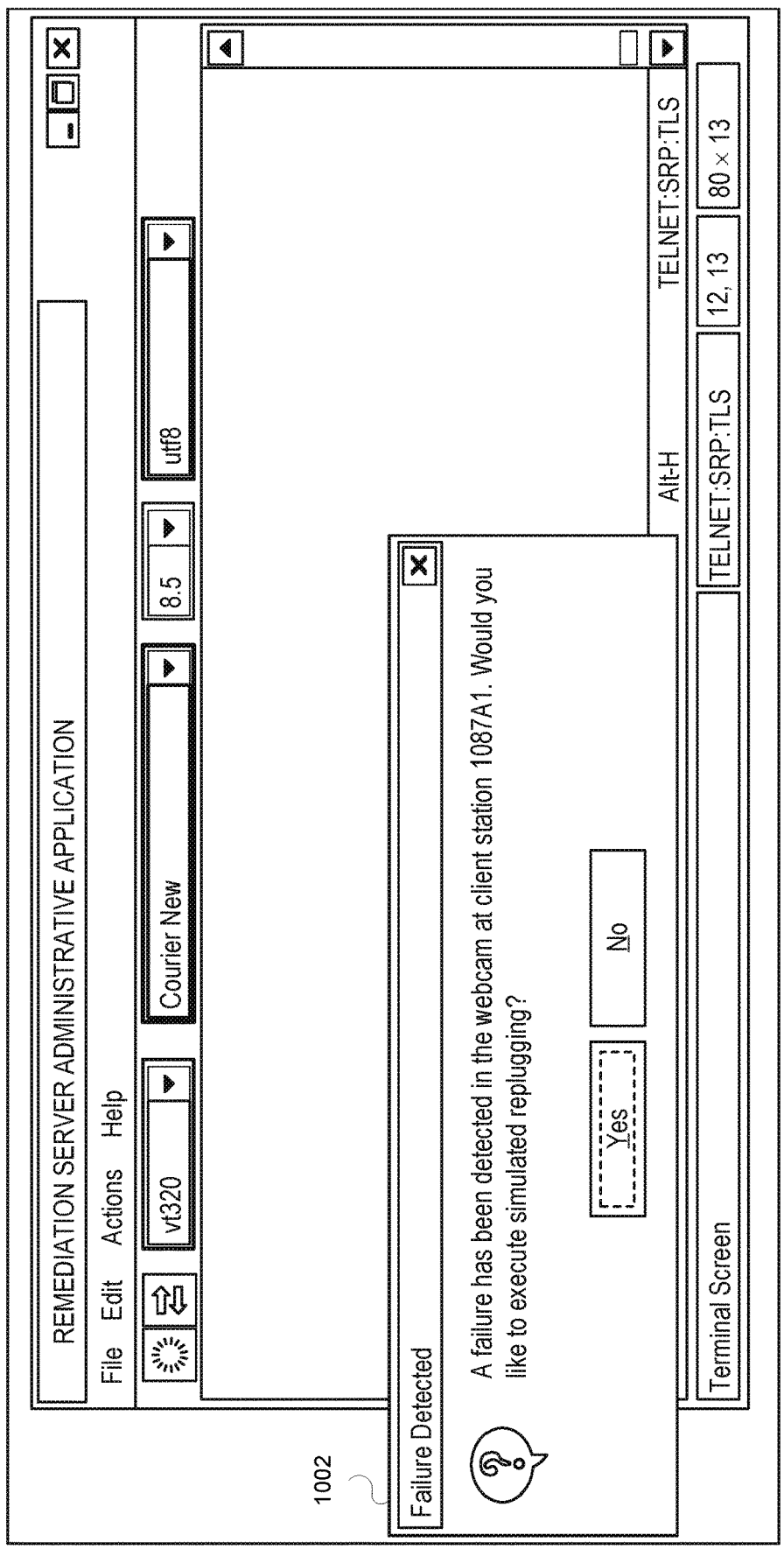
FIG. 10 is another illustration of the example graphical user interface that may be used in connection with the systems and methods for remediating computing resources.

In some examples, performance module 204 may perform the remedial action as part of a computing device, such as server 206, to autonomously simulate a user re-plugging the computer peripheral device without manual intervention. In these examples, performance module 204 may optionally perform in a fully autonomous manner that eliminates any request or requirement for a human user to facilitate or coordinate the simulation of the unplugging and re-plugging action at step 104. Alternatively, in some examples, performance module 204 may perform the remedial action in coordination with a user or administrator. For example, performance module 204 may perform the remedial action after displaying a prompt requesting administrator approval for performing the remedial action and subsequently receiving the approval from a corresponding administrator. FIG. 10 shows another example of the illustrative graphical user interface for the remediation server administrative application. In this example, the graphical user interface shows, in a pop-up window 1002, the following prompt to an administrator, "a failure has been detected in the webcam at client station 1087A1." The prompt further asks the administrator "would you like to execute simulated unplugging?" The graphical user interface further includes optional "yes" and "no" buttons that the administrator may click upon to indicate a corresponding decision about whether to execute the simulated unplugging operation of step 104. Accordingly, in these examples, performance module 204 may only perform the remedial action of step 104 after receiving confirmation by the administrator, or another user, that the remedial action should be performed. Moreover, in some examples, performance module 204 may only perform the remedial action after first confirming with the administrator that the computer peripheral device has actually experienced a failure, as discussed above in more detail regarding FIG. 9.

Figure 11:
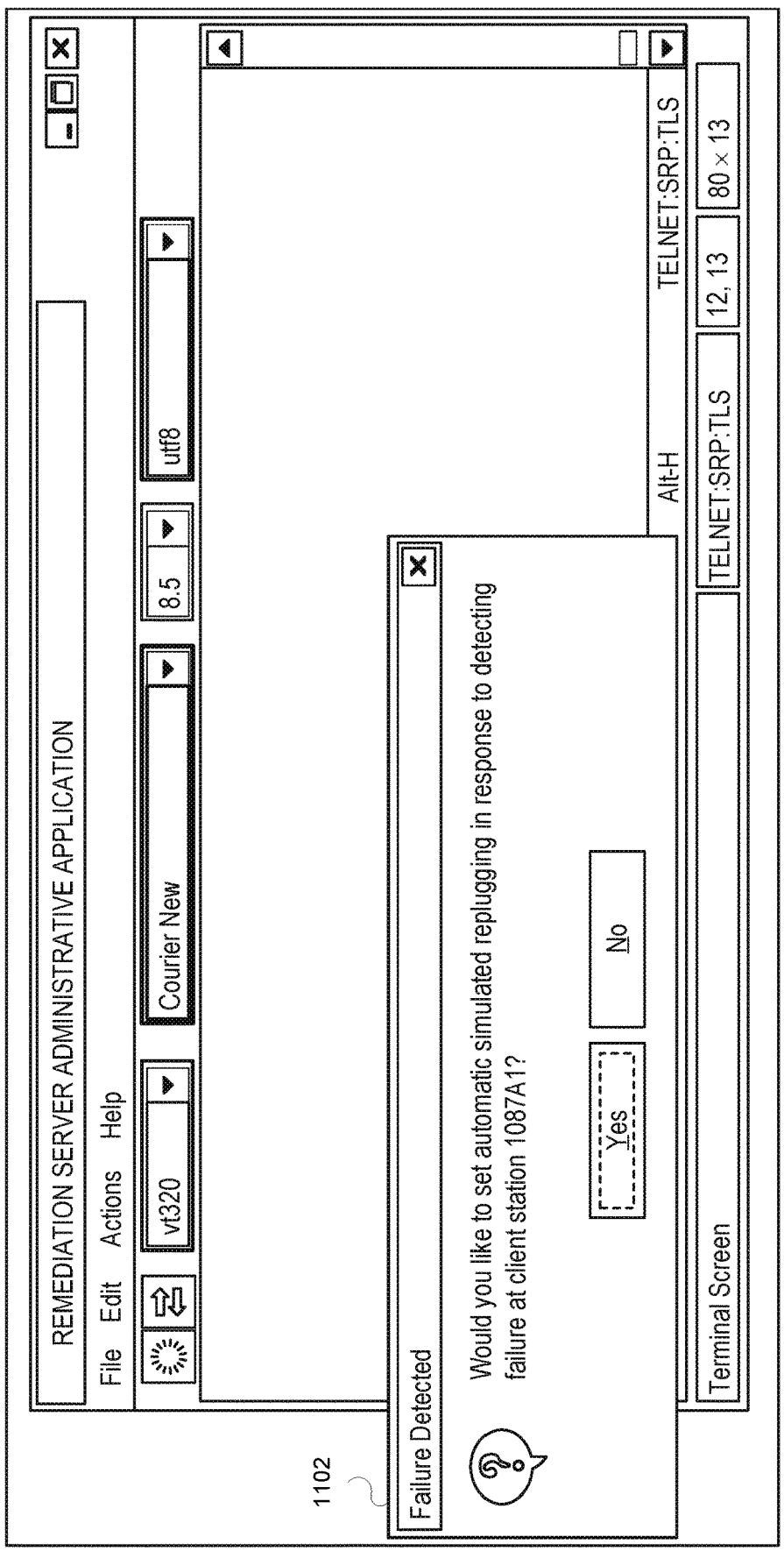
FIG. 11 is another illustration of the example graphical user interface that may be used in connection with the systems and methods for remediating computing resources.

In some examples, performance module 204 may autonomously perform the remedial action of step 104 in accordance with a predefined or established policy that authorizes performance module 204 to autonomously perform the remedial action whenever the computer peripheral device experiences a failure. FIG. 11 shows another example of the illustrative graphical user interface discussed above in connection with FIGS. 9 and 10. In this example, the graphical user interface further prompts the administrator with a prompt, shown in a pop-up window 1102, asking the administrator "would you like to set automatic simulated re-plugging in response to detecting the failure at client station 1087A1?" Accordingly, in this manner the administrator may click upon the optional "yes" button to establish a policy of performance module 204 autonomously, and automatically, performing the remedial action of step 104 in response to detecting a failure at a corresponding computer device or computer peripheral device. Moreover, in more detailed examples the administrator may establish a policy that is more dynamic and/or granular, such as by defining a more complex set of conditions that must be established prior to performance module 204 performing the remedial action.

Figure 7:
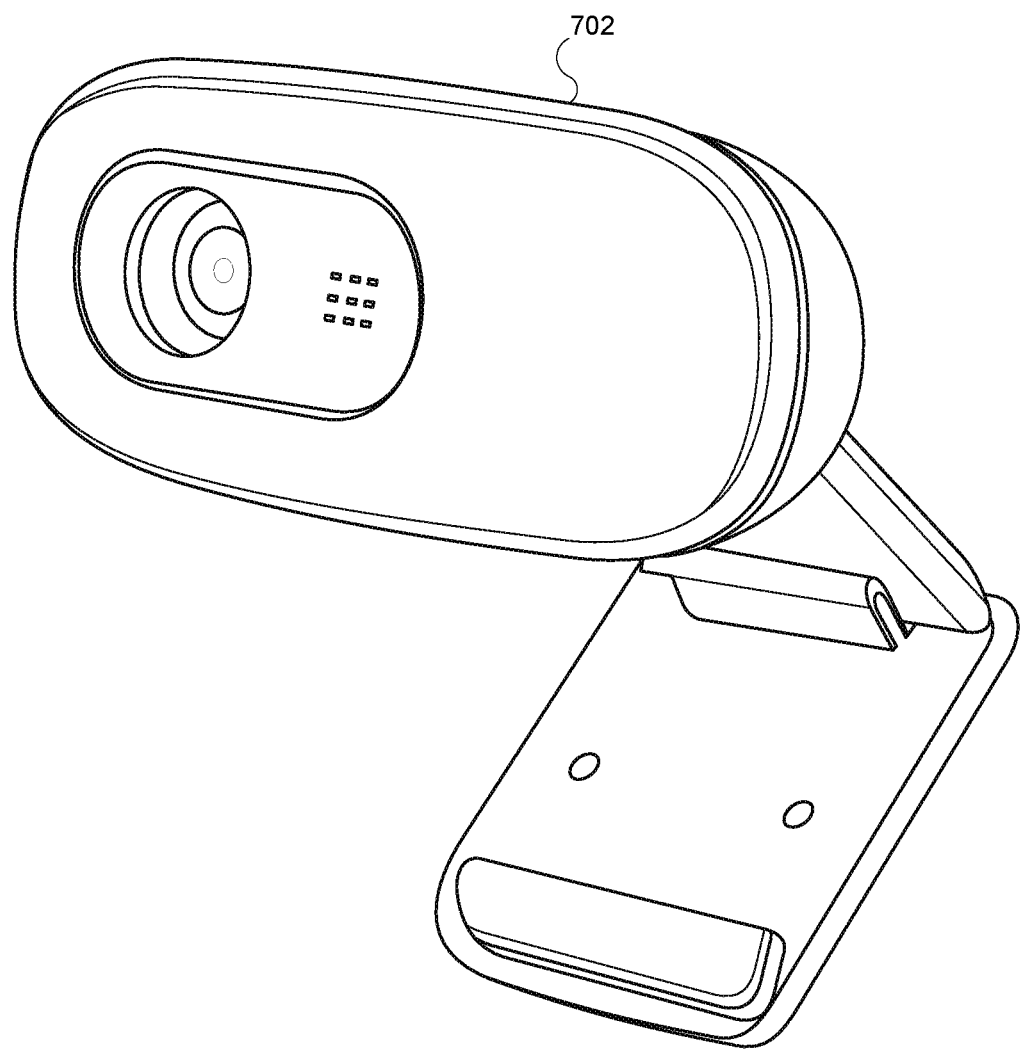
FIG. 7 is an illustration of an example consumer-grade computer peripheral device.
Figure 8:
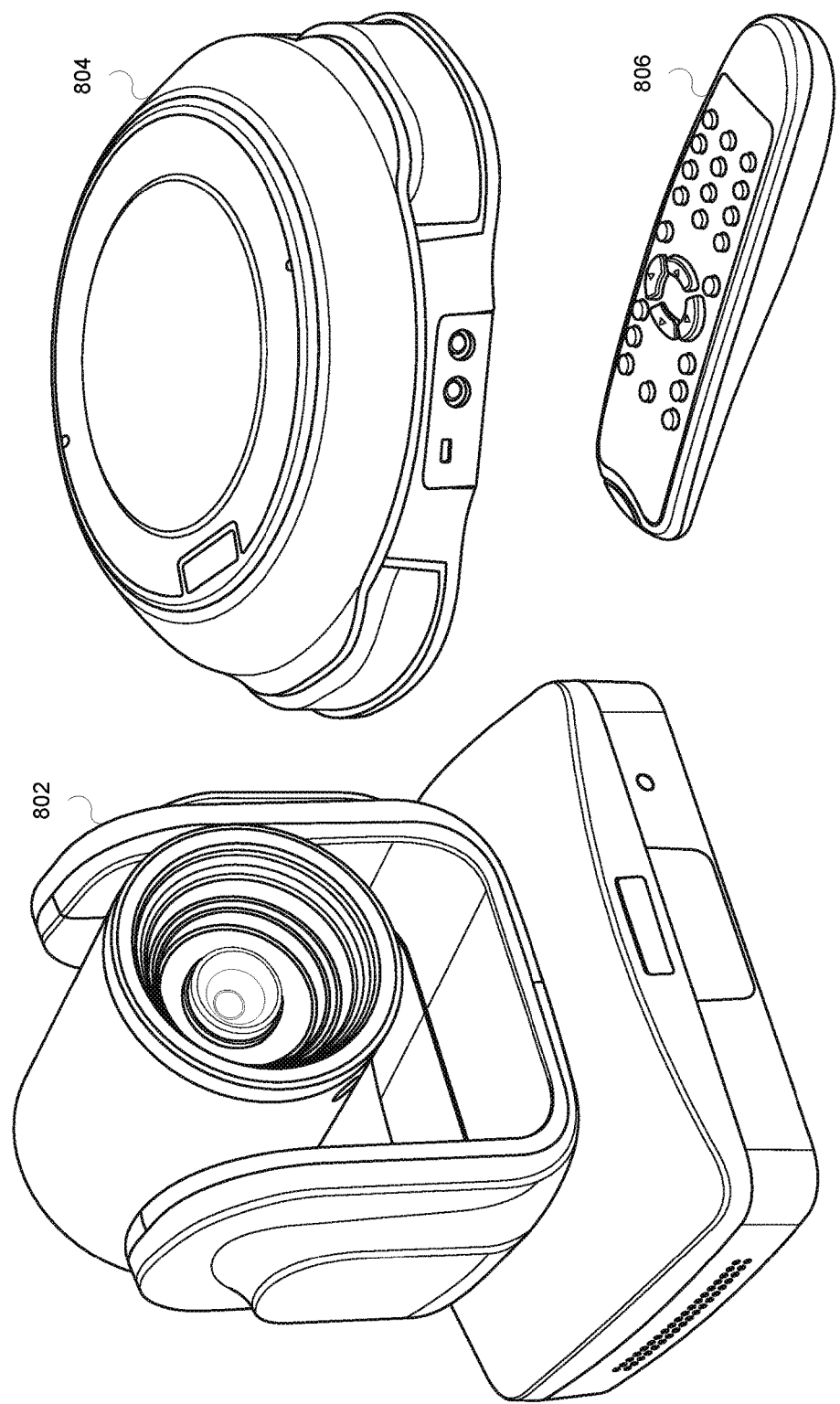
FIG. 8 is an illustration of an example professional-grade computer peripheral device.

Additionally or alternatively, in some examples performance module 204 may perform the remedial action such that the computer peripheral device achieves an enterprise-grade level of reliability, according to a predefined reliability metric, rather than a consumer-grade level of reliability. In these examples, the predefined reliability metric or policy may specify values that, when measured for the computer peripheral device, indicate that the computer peripheral device is either achieving the enterprise-grade level of reliability or instead the consumer-grade level of reliability. As further discussed above, an enterprise-grade level of reliability may be associated with more expensive enterprise-grade products that are marketed to larger firms, institutions, and corporate enterprise organizations. For purposes of illustration, FIG. 8 shows an example generic professional-grade or enterprise-grade computer peripheral device corresponding to a videoconferencing camera system, including a camera 802, a microphone and/or base station 804, and/or a remote control 806. In contrast, the consumer-grade level of reliability may be associated with less expensive consumer-grade products that are marketed directly to endpoint consumers with relatively lower budgets. For purposes of illustration, FIG. 7 shows an example generic consumer-grade computer peripheral device 702 corresponding to a videoconferencing webcam.

As one illustrative example, the enterprise-grade level of reliability and/or the consumer-grade level of reliability may be defined in terms of a threshold that specifies an amount of time since the computer peripheral device last experienced a failure. Accordingly, in these examples, the enterprise-grade level of reliability may specify a much larger threshold, in terms of the amount of time, than the consumer-grade level of reliability. In other examples, the enterprise-grade level of reliability and/or the consumer-grade level of reliability may be defined in terms of an amount of time during which the computer peripheral device experiences a failure, when measured across a total amount of time. In these examples, the enterprise-grade level of reliability may specify a much smaller duration of downtime than the consumer-grade level of reliability. Moreover, the automated and autonomous nature of various embodiments of the disclosed subject matter may achieve the enterprise-grade level of reliability by performing the simulated re-plugging action in a manner that is much faster and/or more consistent than the previously performed manual re-plugging operation discussed above, as well as by performing the simulated re-plugging action on a massive scale across entire computing network, server farms, and/or data warehouses, whenever failures in computer peripheral devices are detected, as further discussed above.

As further discussed above, the disclosed systems and methods may improve upon related systems by leveraging lower cost consumer-grade computing goods to nevertheless provide a professional-grade level of performance and reliability. The disclosed systems and methods may provide these benefits by simulating the unplugging and re-plugging of a computer peripheral device at a larger computing device without actually removing and reinserting the computer peripheral device. Instead, the disclosed systems and methods may selectively modify one or more signals along the computing bus to which the computer peripheral device is connected to thereby simulate the unplugging and re-plugging action that would otherwise be performed manually by a user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a request for a computing resource, transform the request, output a result of the transformation to a storage or output device, use the result of the transformation to initialize an environment of the computing resource, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system, comprising: a detection module, stored in memory, that detects a failure in a computer peripheral device; a performance module, stored in memory, that performs a remediation action in response to detecting the failure in the computer peripheral device, by accessing the computer peripheral device profile that specifies criteria defining tolerable input or output data of the computer peripheral device and distinguishes between a failure situation and a non-failure situation, and based on a conclusion that the failure was detected at the computer peripheral device rather than other computing components where failure has not been detected, the remediation action comprising selectively modifying at least one signal to a computing bus to which the computer peripheral device is connected to simulate both: unplugging the computer peripheral device from the computing bus without physically removing the computer peripheral device; and plugging back the computer peripheral device into the computing bus without physically reinserting the computer peripheral device into the computing bus; and at least one physical processor that is configured to execute the detection module and the performance module; wherein: selectively modifying the signal to the computing bus simulates a manual operation of physically unplugging the computer peripheral device and then re-plugging the computer peripheral device into a larger computing device while nevertheless permitting the larger computing device to proceed according to normal operations in contrast to simulating an operation of rebooting the larger computing device by toggling a power switch.

2. The system of claim 1, wherein the computer peripheral device is plugged into an expansion socket of the computing bus.

3. The system of claim 2, wherein the computing bus comprises a UNIVERSAL SERIAL BUS.

4. The system of claim 3, wherein the computer peripheral device comprises a web cam.

5. The system of claim 1, wherein the detection module detects the failure in the computer peripheral device by:
   applying the device profile to output produced by the computer peripheral device; and
   determining, in response to applying the device profile to the output produced by the computer peripheral device, that the computer peripheral device has failed.

6. The system of claim 1, wherein the detection module detects the failure in the computer peripheral device by receiving an indication from a user that the computer peripheral device has failed.

7. The system of claim 6, wherein the detection module receives the indication from the user that the computer peripheral device has failed in response to the detection module querying the user to confirm whether the computer peripheral device has failed.

8. The system of claim 6, wherein the detection module uses the indication from the user as a decisive factor to conclude that the computer peripheral device has experienced the failure.

9. The system of claim 6, wherein the detection module uses the indication from the user as merely one factor, among a number of different other factors, that the detection module evaluates in deciding whether to conclude that the computer peripheral device has experienced a failure.

10. The system of claim 1, wherein the computer peripheral device that undergoes the simulated unplugging and re-plugging is the same computer peripheral device where the detected failure occurred.

11. A computer-implemented method, comprising: detecting a failure in a computer peripheral device; and performing a remediation action in response to detecting the failure in the computer peripheral device, by accessing the computer peripheral device profile that specifies criteria defining tolerable input or output data of the computer peripheral device and distinguishes between a failure situation and a non-failure situation, and based on a conclusion that the failure was detected at the computer peripheral device rather than other computing components where failure has not been detected, the remediation action comprising selectively modifying at least one signal to a computing bus to which the computer peripheral device is connected to simulate both: unplugging the computer peripheral device from the computing bus without physically removing the computer peripheral device; and plugging back the computer peripheral device into the computing bus without physically reinserting the computer peripheral device into the computing bus; wherein: selectively modifying the signal to the computing bus simulates a manual operation of physically unplugging the computer peripheral device and then re-plugging the computer peripheral device into a larger computing device while nevertheless permitting the larger computing device to proceed according to normal operations in contrast to simulating an operation of rebooting the larger computing device by toggling a power switch.

12. The method of claim 11, wherein the computing bus comprises a UNIVERSAL SERIAL BUS.

13. The method of claim 11, wherein the remedial action is performed by the larger computing device to autonomously simulate a user re-plugging the computer peripheral device without manual intervention.

14. The method of claim 11, wherein the detecting the failure in the computer peripheral device is performed autonomously by the larger computing device without manual intervention.

15. The method of claim 11, wherein detecting the failure in the computer peripheral device comprises:
 applying the device profile to output produced by the computer peripheral device; and
 determining, in response to applying the device profile to the output produced by the computer peripheral device, that the computer peripheral device has failed.

16. The method of claim 11, wherein detecting the failure in the computer peripheral device is performed by receiving an indication from a user that the computer peripheral device has failed.

17. The method of claim 11, wherein the failure comprises one of:
 a total failure of the computer peripheral device; and
 a partial failure of the computer peripheral device.

18. The method of claim 11, wherein selectively modifying the signal to the computing bus to which the computer peripheral device is connected comprises discontinuing the signal.

19. The method of claim 18, wherein selectively modifying the signal to the computing bus to which the computer peripheral device is connected comprises discontinuing all signals between the computing bus and the computer peripheral device.

20. A non-transitory computer-readable medium comprising one or more computer-executable instructions that, when executed by at least one processor of a computing device, cause the computing device to: detect a failure in a computer peripheral device; and perform a remediation action in response to detecting the failure in the computer peripheral device, by accessing the computer peripheral device profile that specifies criteria defining tolerable input or output data of the computer peripheral device and distinguishes between a failure situation and a non-failure situation, and based on a conclusion that the failure was detected at the computer peripheral device rather than other computing components where failure has not been detected, the remediation action comprising selectively modifying at least one signal to a computing bus to which the computer peripheral device is connected to simulate both: unplugging the computer peripheral device from the computing bus without physically removing the computer peripheral device; and plugging back the computer peripheral device into the computing bus without physically reinserting the computer peripheral device into the computing bus; wherein: selectively modifying the signal to the computing bus simulates a manual operation of physically unplugging the computer peripheral device and then re-plugging the computer peripheral device into the computing device while nevertheless permitting the computing device to proceed according to normal operations in contrast to simulating an operation of rebooting the computing device by toggling a power switch.

\* \* \* \* \*